(12) United States Patent
Yoshida et al.

(10) Patent No.: US 12,332,543 B2
(45) Date of Patent: Jun. 17, 2025

(54) CAMERA MODULE

(71) Applicant: Sharp Sensing Technology Corporation, Tenri (JP)

(72) Inventors: Haruno Yoshida, Tenri (JP); Akihiro Iida, Tenri (JP); Yoshihito Ishizue, Tenri (JP)

(73) Assignee: Sharp Sensing Technology Corporation, Tenri (JP)

( * ) Notice: Subject to any disclaimer, the term of this patent is extended or adjusted under 35 U.S.C. 154(b) by 482 days.

(21) Appl. No.: 17/969,675

(22) Filed: Oct. 19, 2022

(65) Prior Publication Data
US 2023/0375899 A1     Nov. 23, 2023

(30) Foreign Application Priority Data

May 18, 2022    (JP) ................................. 2022-081734

(51) Int. Cl.
*G03B 13/34*     (2021.01)
*G03B 17/17*     (2021.01)

(52) U.S. Cl.
CPC .............. *G03B 13/34* (2013.01); *G03B 17/17* (2013.01)

(58) Field of Classification Search
CPC ................................. G03B 13/34; G03B 17/17
USPC .................................. 359/819, 822, 823, 824
See application file for complete search history.

(56) References Cited

U.S. PATENT DOCUMENTS 10,371,928 B2    8/2019   Goldenberg et al.
2024/0319472 A1*    9/2024   Kwon .................... G03B 17/12

FOREIGN PATENT DOCUMENTS

JP        5611533 B2     10/2014

* cited by examiner

*Primary Examiner* — William Choi
(74) *Attorney, Agent, or Firm* — ScienBiziP, P.C.

(57) ABSTRACT

A camera module comprises a first lens barrel holding a first lens group configured to receive object light; a second lens barrel holding a second lens group disposed in a traveling direction of the object light with respect to the first lens group; a lens driving unit configured to drive the second lens barrel in a first direction along a first optical axis of the second lens group; and a guide for guiding a direction in which the second lens barrel is driven, wherein the first lens barrel has a first guide recess fitted in the guide, the second lens barrel has a second guide recess fitted in the guide, one of the first guide recess and the second guide recess fixes the guide in the first direction, and the guide slides in the first direction with respect to another of the first guide recess and the second guide recess.

9 Claims, 5 Drawing Sheets

CAMERA MODULE

CROSS-REFERENCE TO RELATED APPLICATION

The present application claims priority from Japanese Application JP2022-081734, the content of which is hereby incorporated by reference into this application.

BACKGROUND

1. Field

One aspect of the disclosure relates to a camera module.

A camera module of a whole-group extension type has been known (Japanese Patent No. 5611533) that includes a plurality of image pickup lenses for taking a subject's image, a lens barrel holding the plurality of image pickup lenses, and a lens driver that drives the lens barrel, and the camera module extends the lens barrel holding this set of image pickup lenses.

Further, another camera module of the whole-group extension type has been known (U.S. patent Ser. No. 10/371,928) that includes a reflective element, such as a prism or mirror, that is anterior to a plurality of image pickup lenses in order to thin a smartphone on which the camera module is to be mounted, and the reflective element can incline the optical axis of light from a subject, from a direction perpendicular to the smartphone's backside to a direction parallel to the smartphone's backside.

SUMMARY

Unfortunately, Japanese Patent No. 5611533 requires a clearance for the image pickup lenses to move in the direction along the optical axis by a length equal to the amount of extension in the whole-group extension type; hence, a camera module that includes a telephoto lens with a long focal length particularly involves a large amount of extension, thus upsizing the camera module and making it difficult to downsize and slim down the camera module.

Further, when the whole-group extension type is combined with a folding optical system, as described in U.S. patent Ser. No. 10/371,928, in order to solve this problem, a clearance distance equal to or larger than the amount of whole-group lens extension in the lens driver is required between the lenses and the reflective element.

Light rays spread out by the field angle of the lenses in accordance with this clearance distance. The reflective element needs to be also upsized along with the light ray spread, thus increasing the thickness and footprint of the camera module as well.

Accordingly, an attempt to obtain a camera module of this type with a large amount of whole-group extension results in an upsized camera module similarly, and downsizing and thickness reduction are difficult to achieve.

Herein, a possible way to avoid the whole-group lens extension in a camera module is adapting inner focus for driving only some of the lenses, but this method involves separation of the lens group into two: a fixed part and a movable part; thus, it is considerably difficult in production to bring the lens centers of the two groups into agreement with high accuracy.

One aspect of the disclosure aims to provide an inner-focus camera module with higher productivity while achieving downsizing and slimming down of an optical system and of a camera module.

To solve the above problem, a camera module according to one aspect of the disclosure includes the following: a first lens barrel holding a first lens group configured to receive object light; a second lens barrel holding a second lens group disposed in a traveling direction of the object light with respect to the first lens group; a lens driving unit configured to drive the second lens barrel in a first direction along a first optical axis of the second lens group; and a guide for guiding a direction where the lens driving unit drives the second lens barrel, wherein the first lens barrel has a first guide recess fitted in the guide, the second lens barrel has a second guide recess fitted in the guide, one of the first guide recess and the second guide recess is formed so as to fix the guide in the first direction, and another of the first guide recess and the second guide recess is formed in such a manner that the guide slides in the first direction with respect to the another.

The aspect of the disclosure can provide an inner-focus camera module with higher productivity while achieving downsizing and slimming down of an optical system and of a camera module.

DESCRIPTION OF EMBODIMENTS

First Preferred Embodiment

Figure 1:
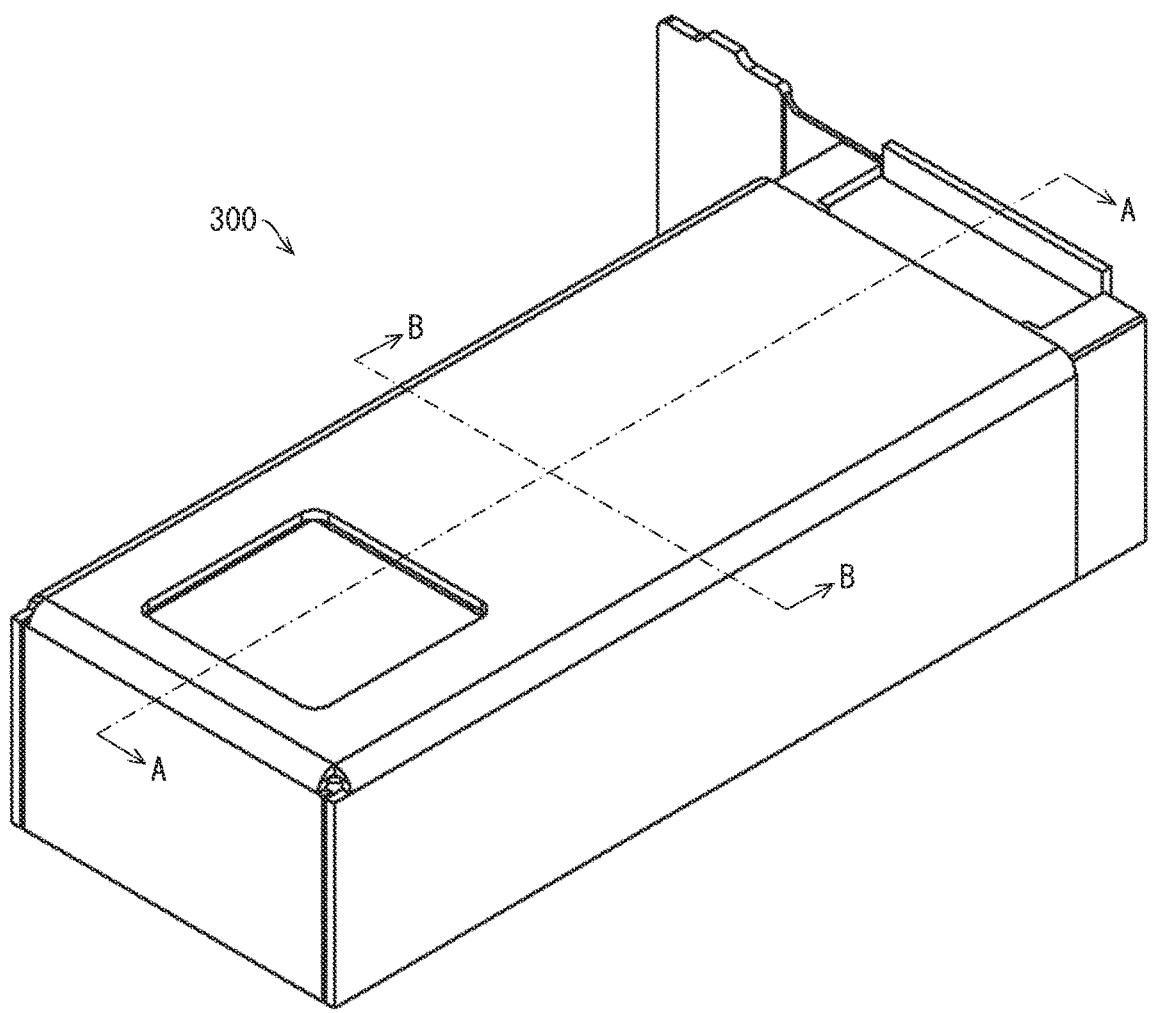
FIG. 1 is a perspective view of a camera module according to a first preferred embodiment.
Figure 2:
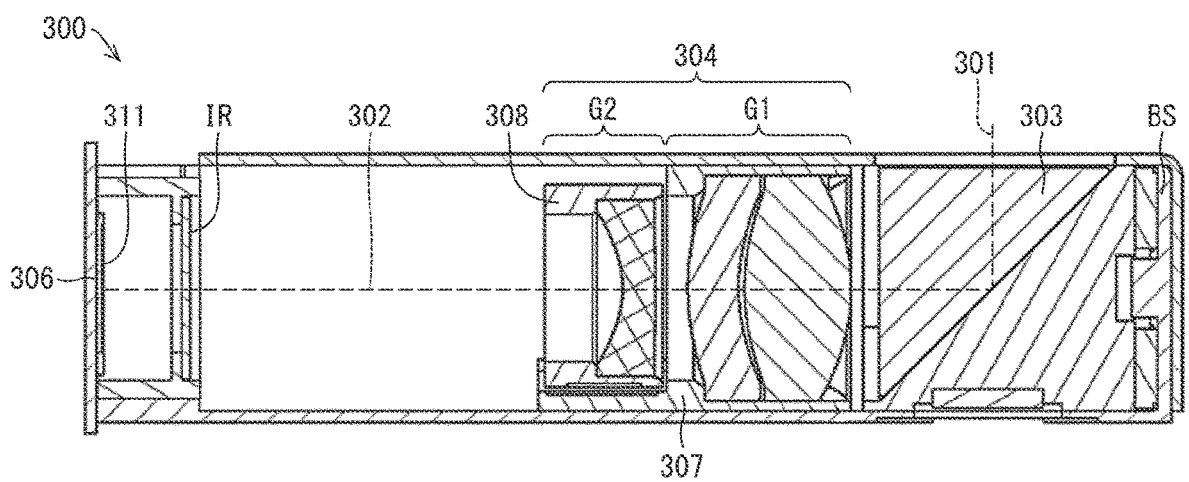
FIG. 2 is a sectional view taken along line A-A in FIG. 1.
Figure 3:
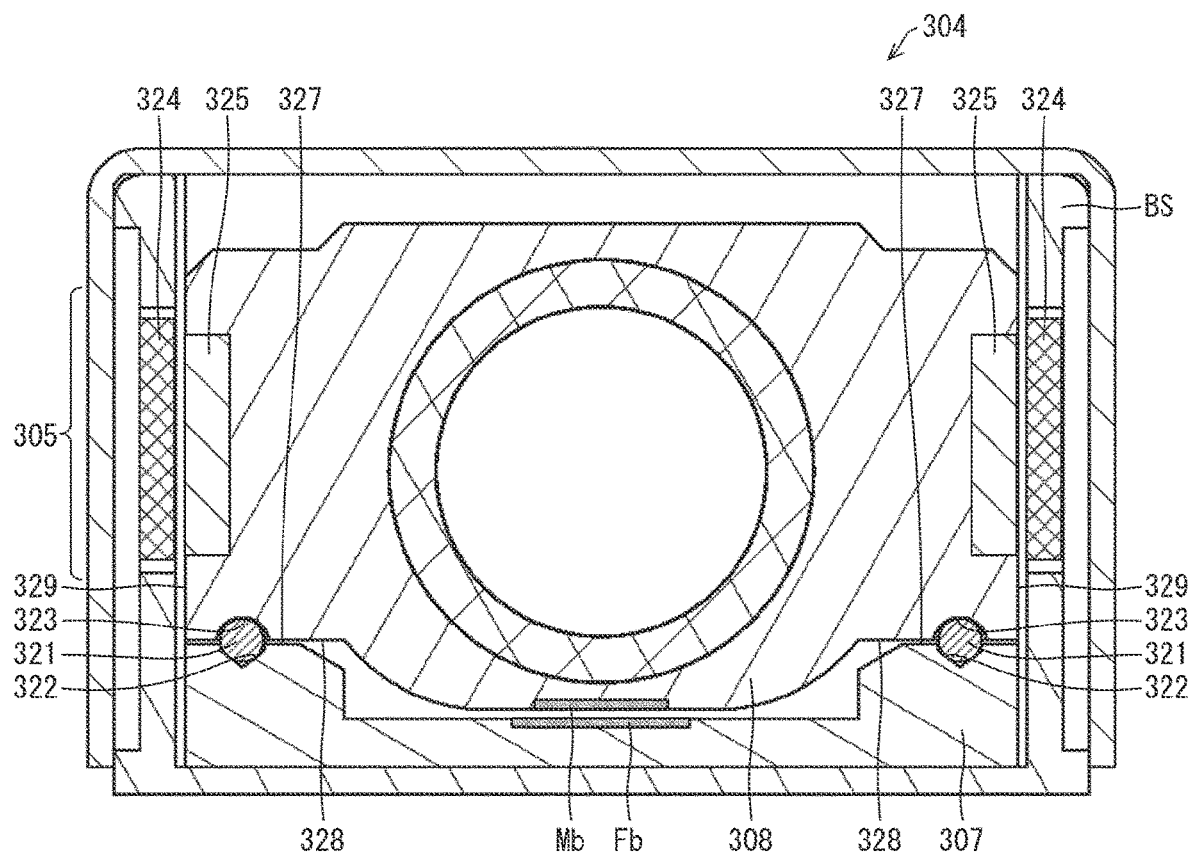
FIG. 3 is a sectional view taken along line B-B in FIG. 1.

One preferred embodiment of the disclosure will be detailed. FIG. 1 is a perspective view of a camera module 300 according to a first preferred embodiment. FIG. 2 is a sectional view taken along line A-A in FIG. 1 and corresponds to a sectional view of the camera module 300 with its middle part cut in a direction along the optical axis. FIG. 3 is a sectional view taken along line B-B in FIG. 1.

The camera module 300 includes an optical system 304, and an image pickup unit 306 having an image formation surface 311 that concentrates object light that has passed through the optical system 304, and configured to subject the object light to photoelectric conversion.

The optical system 304 includes the following: a first lens group G1 including two or more lenses, having a positive power as a whole and configured to receive object light; a second lens group G2 including one or more lenses, having a negative power as a whole and being posterior to the first lens group G1 to concentrate the object light; and a lens driving unit 305 configured to move the second lens group G2 in a direction along a first optical axis 302.

The camera module 300 further includes a first lens barrel 307 holding the perimeter of the first lens group G1, and a second lens barrel 308 holding the perimeter of the second lens group G2. The lens driving unit 305 holds the perimeter of the second lens barrel 308.

The size of the lens driving unit 305 in a direction perpendicular to the first optical axis 302 is smaller than the size of the first lens barrel 307 in the direction perpendicular to the first optical axis 302.

As described, the camera module 300 includes the following: the first lens barrel 307 holding the first lens group G1 configure to receive object light; the second lens barrel 308 holding the second lens group G2 disposed in the traveling direction of the object light with respect to the first lens group G1; and the lens driving unit 305 configured to drive the second lens barrel 308 in a direction along the first optical axis 302 of the second lens group G2. Moreover, the camera module 300 includes balls 321 (guides) for guiding a direction where the lens driving unit 305 drives the second lens barrel 308. The first lens barrel 307 has guide grooves 322 (first guide recesses) fitted in the balls 321. The second lens barrel 308 has guide holes 323 (second guide recesses) fitted in the balls 321. The guide holes 323 are formed so as to fix the balls 321 in a direction (first direction) parallel to the first optical axis 302. The guide grooves 322 are formed in such a manner that the balls 321 slide in the direction along the first optical axis 302 with respect to the guide grooves 322.

As described, the camera module 300 includes the balls 321, guide grooves 322 and guide holes 323 disposed between the first lens barrel 307, holding the first lens group G1, and the second lens barrel 308, holding the second lens group G2. Accordingly, the second lens barrel 308 has a high degree of self-alignment, thereby successfully brining the lens centers of the two groups, i.e., the first lens group G1 and the second lens group G2, into agreement with high accuracy.

Each guide hole 323 has a hemispherical surface formed so as to be fitted in the corresponding ball 321. Each guide groove 322 has such a shape that the corresponding ball 321 slides in the direction along the first optical axis 302.

A plurality of balls 321 are preferably provided for a single guide groove 322. A plurality of guide holes 323 are provided in correspondence with the plurality of balls 321.

A plurality of guide grooves 322 are preferably formed in the direction along the first optical axis 302. A plurality of balls 321 are preferably provided in correspondence with the plurality of guide grooves 322. A plurality of guide holes 323 are provided in correspondence with the plurality of balls 321.

The lens driving unit 305 includes a voice coil motor.

The voice coil motor includes, as illustrated in FIG. 3, a coil 324 and a magnet 325 attached to the second lens barrel 308 to face the coil 324. The second lens barrel 308 has a flat surface 328 provided with the guide holes 323, and a side surface 329 crossing the flat surface 328. The magnet 325 is attached to the side surface 329.

As described, the magnet 325 of the voice coil motor (VCM), which is the lens driving unit 305, is attached to the side surface 329, which is at the right angle to the flat surface 328 provided with the guide holes 323. This can downsize the camera module 300.

The first lens barrel 307 has a placement surface 327 for placing the second lens barrel 308. The second lens barrel 308 has the flat surface 328 (bottom surface) facing the placement surface 327. The guide grooves 322 are formed in the placement surface 327. The guide holes 323 are formed in the flat surface 328.

The camera module 300 further includes the following: the reflective element 303 configured to guide, along the first optical axis 302, object light that has entered along a second optical axis 301 intersecting with the first optical axis 302; the image pickup unit 306 having an image pickup element configured to convert the object light that has passed through the second lens group G2 into an electric signal; and a case BS holding the reflective element 303, the first lens barrel 307, the lens driving unit 305 and the image pickup unit 306.

The balls 321 are a member that guides the driving direction of the second lens group G2 and can be composed of, for instance, a ceramic ball.

The lens driving unit 305 includes the magnet 325 attached to the second lens barrel 308, and the coil 324 attached to the case BS and constitutes a voice coil motor (VCM).

The first lens barrel 307 has two guide grooves 322 in one plane in a direction parallel to the first optical axis 302. The first lens barrel 307 is fixed to the case BS with respect to the image pickup unit 306 and reflective element 303 in the direction along the first optical axis 302.

The second lens barrel 308 has as many guide holes 323 as the guide grooves 322 at sites facing the guide grooves 322. A single ball 321 is disposed in each of the two guide groove 322.

The guide holes 323 have a hemispherical shape with a radius equal to or larger than the radius of the balls 321. The guide grooves 322 have a V-shape in cross section. It is noted that the guide grooves 322 may be formed in the second lens barrel 308; in this case, the first lens barrel 307 is provided with hemispherical guide holes 323.

The second lens barrel 308 is held with respect to the first lens barrel 307 via the balls 321 fitted in the guide holes 323.

The first lens barrel 307 undergoes attachment of an iron holding plate Fb, and the second lens barrel 308 undergoes attachment of a holding magnet Mb having a weak magnetic force, so that the second lens barrel 308 is held so as not to deviate from the direction along the first optical axis 302.

The lens driving unit 305 drives the second lens barrel 308 with the thrust of the voice coil motor while guiding, with the guide grooves 322, guide holes 323 and balls 321, the second lens barrel 308 in a direction substantially coinciding with the first optical axis 302.

The position of the guide grooves 322 and guide holes 323 is not limited to what is shown in FIG. 3. The guide grooves 322 and the guide holes 323 need to be disposed in a location where the first lens barrel 307 can support the second lens barrel 308 via the balls 321. It is noted that guide grooves and guide holes may be provided in only a location shown in FIG. 5 according to a second preferred embodiment, which will be described later on, rather than in the location shown in FIG. 3.

The optical system 304 concentrates light rays guided along the second optical axis 301 by the reflective element 303 onto the image pickup unit 306 to form an image.

The image pickup unit 306 is a sensor device having an image pickup element that converts, through photoelectric conversion, light rays concentrated by the optical system 304 into an electric signal. The electric signal undergoes software processing and is finally output as an image.

The image pickup unit 306 can achieve the function of optical hand-induced-shake correction, as described later on, by the provision of a driving mechanism between the image pickup unit 306 and the case BS.

An infrared-rays cutting filter IR has the function of blocking infrared rays contained in light that enters the image pickup unit 306.

Further, if a foreign substance (dust) attaches to the image pickup unit 306 directly, the convergence of light is hindered, degrading an image seriously; hence, the infrared-rays cutting filter IR is provided forward of the image pickup unit 306 and thus has the function of reducing the risk of direct attachment of a foreign substance to the image pickup unit 306.

It is noted that the camera module 300 according to this preferred embodiment can offer a configuration that achieves optical hand-induced-shake correction by rotating the reflective element 303 about any two axes.

The foregoing configuration includes the following: a shake detecting means for detecting a hand-induced shake; a controller that controls a driving unit for the reflective element 303 on the basis of a signal sent from the shake detecting means; the driving unit for rotating the reflective element 303; and a retainer holding the reflective element 303 to propagate the operation of the driving unit to move the reflective element 303.

Alternatively, the camera module 300 according to this preferred embodiment can offer a configuration that achieves optical hand-induced-shake correction by moving the optical system 304 in parallel with any two axes.

The foregoing configuration includes the following: a shake detecting means for detecting a hand-induced shake; a controller that controls a driving unit for the optical system 304 on the basis of a signal sent from the shake detecting means; the driving unit for moving the optical system 304; and a retainer holding the optical system 304 to propagate the operation of the driving unit to move the optical system 304.

Further alternatively, the camera module according to this preferred embodiment can offer a configuration that achieves optical hand-induced-shake correction by moving the image pickup unit 306 in parallel with any two axes.

The foregoing configuration includes the following: a shake detecting means for detecting a hand-induced shake; a controller that controls a driving unit for the image pickup unit 306 on the basis of a signal sent from the shake detecting means; the driving unit for moving the image pickup unit 306; and a retainer holding the image pickup unit 306 to propagate the operation of the driving unit to move the image pickup unit 306.

Any of these configurations achieves optical hand-induced-shake correction through driving of two axes of constituent components; thus, combining the driving direction of one component and the driving direction of another component together, e.g., one axis for the rotation axis of the reflective element 303, and another axis for the movement axis of the optical system 304, can also achieve optical hand-induced-shake correction.

These configurations that achieve optical hand-induced-shake correction are known commonly, and their detailed description and illustration will be thus omitted.

Second Preferred Embodiment

Another preferred embodiment of the disclosure will be described. It is noted that for convenience in description, components having the same functions as components described in the foregoing preferred embodiment will be denoted by the same signs, and that their description will not be repeated.

Figure 4:
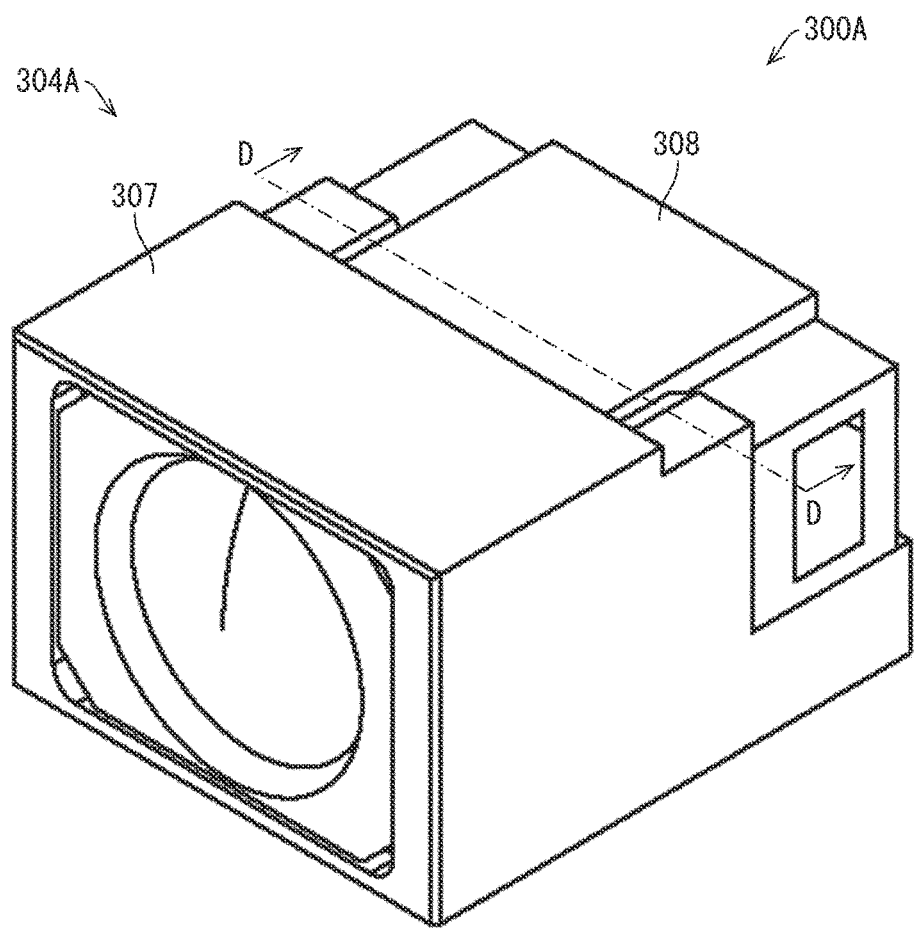
FIG. 4 is a perspective view of an optical system of a camera module according to a second preferred embodiment.
Figure 5:
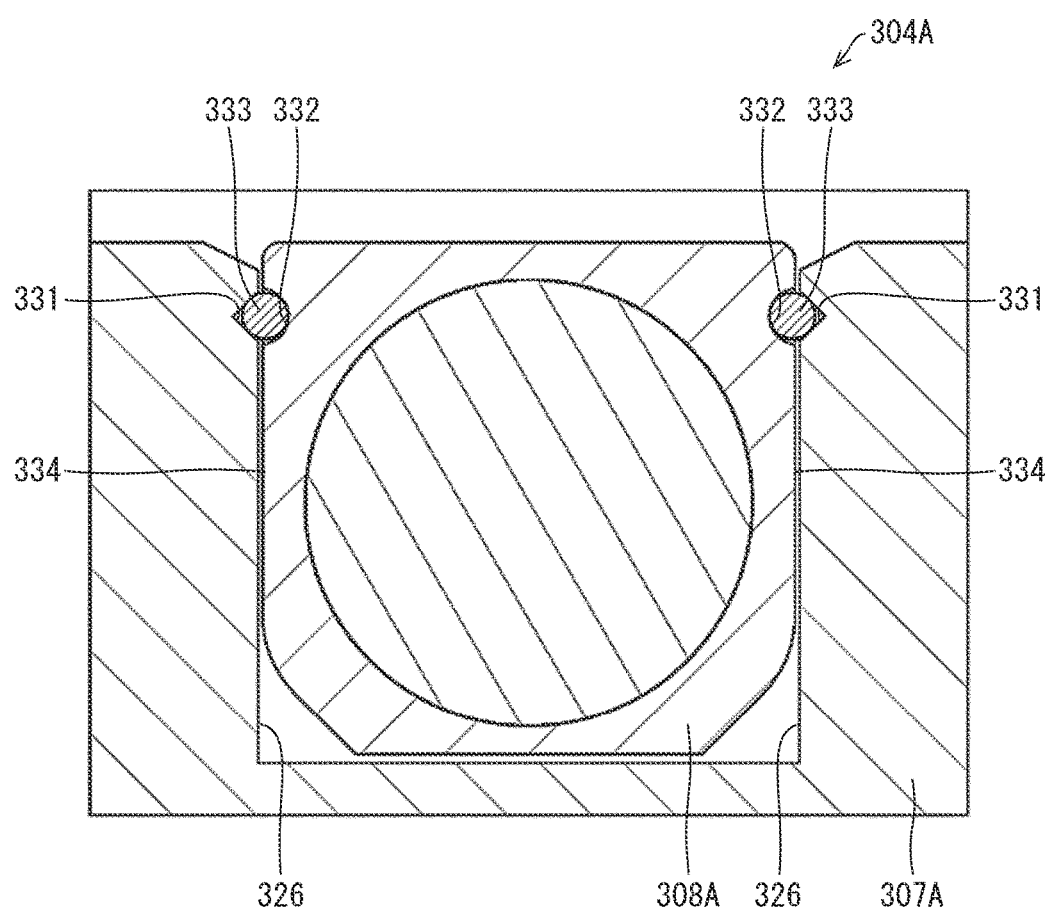
FIG. 5 is a sectional view taken along line D-D in FIG. 4.

FIG. 4 is a perspective view of an optical system 304A of a camera module 300A according to the second preferred embodiment. FIG. 5 is a sectional view taken along line D-D in FIG. 4.

A first lens barrel 307A provided in the optical system 304A of the camera module 300A has an incorporation surface 326 for incorporating a second lens barrel 308A. The second lens barrel 308A has a side surface 334 facing the incorporation surfaces 326. Guide grooves 331 (first guide recesses) are formed in the incorporation surface 326. Guide holes 332 (second guide recesses) are formed in the side surface 334.

As described, the first lens barrel 307A has, in addition to the foregoing components according to the first embodiment, a pair of guide grooves 331 in a pair of incorporation surfaces 326 having an angle that is 90° different from that of the placement surface 327 having the guide grooves 322.

The second lens barrel 308A has as many guide holes 332 as the guide grooves 331 at sites facing the guide grooves 331 in the side surface 334, and a single ball 333 is disposed in each of the pair of guide grooves 331.

The guide holes 332 have a hemispherical shape with a radius equal to or larger than the radius of the balls 333. The guide grooves 331 have a V-shape in cross section. It is noted that guide grooves 331 may be formed in the second lens barrel 308A; in this case, the first lens barrel 307A is provided with hemispherical guide holes 332.

The second lens barrel 308A is held with respect to the first lens barrel 307A via the balls 333 fitted in the guide holes 332 and via the balls 321 fitted in the guide holes 323.

The forgoing configuration enables the second lens group G2 to easily undergo positional adjustment in the direction along the first optical axis 302.

Summary

A camera module 300, 300A according to a first aspect of the disclosure includes the following: a first lens barrel 307, 307A holding a first lens group G1 configured to receive object light; a second lens barrel 308, 308A holding a second lens group G2 disposed in the traveling direction of the object light with respect to the first lens group G1; a lens driving unit 305 configured to drive the second lens barrel 308, 308A in a first direction along a first optical axis 302 of the second lens group G2; and a guide (ball 321, 333) for guiding a direction where the lens driving unit 305 drives the second lens barrel 308, 308A. The first lens barrel 307, 307A has a first guide recess (guide groove 322, 331) fitted in the guide (ball 321, 333). The second lens barrel 308, 308A has a second guide recess (guide hole 323, 332) fitted in the guide (ball 321, 333). One of the first guide recess (guide groove 322, 331) and the second guide recess (guide hole 323, 332) is formed so as to fix the guide (ball 321, 333) in the first direction. The other of the first guide recess (guide groove 322, 331) and the second guide recess (guide hole 323, 332) is formed in such a manner that the guide (ball 321, 333) slides in the first direction with respect to the other.

In the foregoing configuration, the first lens barrel has a first guide recess fitted in the guide for guiding a direction where the lens driving unit drives the second lens barrel holding the second lens group. Moreover, the second lens barrel has a second guide recess fitted in the guide. One of the first guide recess and the second guide recess is formed so as to fix the guide in the first direction. The other of the first guide recess and the second guide recess is formed in such a manner that the guide slides in the first direction with respect to the other.

This offers a higher-productivity camera module that can easily adjust the position of the second lens group in a direction along the first optical axis, while achieving downsizing and slimming down of the camera module.

The camera module 300, 300A according to a second aspect of the disclosure is preferably configured, in the first aspect, such that the guide includes at least one ball 321, 333, such that the second guide recess includes at least one guide hole 323, 332 having a hemispherical surface fitted in the at least one ball 321, 333, such that and the first guide recess includes at least one guide groove 322, 331 for the at least one ball 321, 333 to slide in the first direction.

In the foregoing configuration, the first lens barrel has at least one guide groove fitted in the at least one ball, and the second lens barrel has at least one guide hole fitted in the at least one ball. Thus, the at least one guide hole in the second lens barrel fixes the at least one ball in the first direction, and along the at least one guide groove in the first lens barrel, the at least one ball slides in the first direction.

The camera module 300, 300A according to a third aspect of the disclosure is preferably configured, in the second aspect, such that the at least one ball 321, 333 includes a plurality of balls provided in the at least one guide groove 322, 331, and such that the at least one guide hole 323, 332 includes a plurality of guide holes provided in correspondence with the plurality of balls 321, 333.

In the foregoing configuration, the at least one ball includes a plurality of balls provided for the at least one guide groove, and the at least one guide hole includes a plurality of guide holes provided in correspondence with the plurality of balls; thus, this configuration enables the second lens group to more easily undergo positional adjustment in the direction along the first optical axis.

The camera module 300, 300A according to a fourth aspect of the disclosure is preferably configured, in the second or third aspect, such that the at least one guide groove 322, 331 includes a plurality of guide grooves formed in the first direction, such that the at least one ball 321, 333 includes a plurality of balls provided in correspondence with the plurality of guide grooves 322, 331, and such that the at least one guide hole 323, 332 includes a plurality of guide holes provided in correspondence with the plurality of balls 321, 333.

In the foregoing configuration, the at least one guide groove includes a plurality of guide grooves provided in the first direction, the at least one ball includes a plurality of balls provided in correspondence with the plurality of guide grooves, the at least one guide hole includes a plurality of guide holes provided in correspondence with the plurality of balls; thus, this configuration enables the second lens group to more easily undergo positional adjustment in the direction along the first optical axis.

The camera module 300, 300A according to a fifth aspect of the disclosure is preferably configured, in the first aspect, such that the lens driving unit 305 includes a voice coil motor.

The foregoing configuration enables the voice coil motor to easily drive the second lens barrel in the first direction along the first optical axis of the second lens group.

The camera module 300 according to a sixth aspect of the disclosure is preferably configured, in the fifth aspect, such that the voice coil motor includes a coil 324, and a magnet 325 attached to the second lens barrel 308 to face the coil 324, such that the second lens barrel 308 has a flat surface 328 provided with the second guide recess (guide hole 323), and a side surface 329 crossing the flat surface 328, and such that the magnet 325 is attached to the side surface 329.

In the foregoing configuration, the second lens barrel has a flat surface provided with the second guide recess, and a side surface crossing the flat surface, and the magnet is attached to the side surface; thus, this configuration achieves downsizing and slimming down of the camera module while enabling the second lens group to easily undergo positional adjustment in the direction along the first optical axis.

The camera module 300A according to a seventh aspect of the disclosure is preferably configured, in the first aspect, such that the first lens barrel 307A has an incorporation surface 326 for incorporating the second lens barrel 308A, such that the second lens barrel 308A has a side surface 334 facing the incorporation surface 326, such that the first guide recess (guide groove 331) is formed in the incorporation surface 326, and such that the second guide recess (guide hole 332) is formed in the side surface 334.

In the foregoing configuration, the first guide recess, which is fitted into the guide, is formed in the incorporation surface of the first lens barrel, which is provided for incorporating the second lens barrel. Moreover, the second guide recess, which is fitted into the guide, is formed in the side surface of the second lens barrel, which faces the incorporation surface. This achieves downsizing and slimming down of the camera module.

The camera module 300 according to an eighth aspect of the disclosure is preferably configured, in the first aspect, such that the first lens barrel 307 has a placement surface 327 for placing the second lens barrel 308, such that the second lens barrel 308 has a bottom surface (flat surface 328) facing the placement surface 327, such that the first guide recess (guide groove 322) is formed in the placement surface 327, and such that the second guide recess (guide hole 323) is formed in the bottom surface (flat surface 328).

In the foregoing configuration, the first guide recess is formed in the placement surface, which is provided for placing the second lens barrel, and the second guide recess is formed in the bottom surface of the second lens barrel, which faces the placement surface. This achieves downsizing and slimming down of the camera module.

In the first aspect, the camera module 300, 300A according to a ninth aspect of the disclosure preferably further includes the following: a reflective element 303 configured to guide, along the first optical axis 302, the object light that has entered along a second optical axis 301 intersecting with the first optical axis 302; an image pickup unit 306 having an image pickup element configured to convert the object light that has passed through the second lens group G2 into an electric signal; and a case BS holding the reflective element 303, the first lens barrel 307, 307A, the lens driving unit 305, and the image pickup unit 306.

In the foregoing configuration, the camera module further includes a reflective element configured to guide, along the first optical axis, the object light that has entered along a second optical axis intersecting with the first optical axis, an image pickup unit having an image pickup element configured to convert the object light that has passed through the second lens group into an electric signal, and a case holding the reflective element, the first lens barrel, the lens driving unit, and the image pickup unit; thus, this configuration achieves downsizing and slimming down of the camera module.

One aspect of the disclosure is not limited to the foregoing preferred embodiments. Various modifications can be devised within the scope of the claims. A preferred embodiment that is obtained in combination, as necessary, with the technical means disclosed in the respective preferred embodiments is also included in the technical scope of the disclosure. Furthermore, combining the technical means disclosed in the respective preferred embodiments can form a new technical feature.

What is claimed is:

1. A camera module comprising:
a first lens barrel holding a first lens group configured to receive object light;
a second lens barrel holding a second lens group disposed in a traveling direction of the object light with respect to the first lens group;

a lens driving unit configured to drive the second lens barrel in a first direction along a first optical axis of the second lens group; and
a guide for guiding a direction where the lens driving unit drives the second lens barrel,
wherein the first lens barrel has a first guide recess fitted in the guide,
the second lens barrel has a second guide recess fitted in the guide,
one of the first guide recess and the second guide recess is formed so as to fix the guide in the first direction, and
another of the first guide recess and the second guide recess is formed in such a manner that the guide slides in the first direction with respect to the another.

2. The camera module according to claim 1, wherein
the guide includes at least one ball,
the second guide recess includes at least one guide hole having a hemispherical surface fitted in the at least one ball, and
the first guide recess includes at least one guide groove for the at least one ball to slide in the first direction.

3. The camera module according to claim 2, wherein
the at least one ball comprises a plurality of balls provided for the at least one guide groove, and
the at least one guide hole comprises a plurality of guide holes provided in correspondence with the plurality of balls.

4. The camera module according to claim 2, wherein
the at least one guide groove comprises a plurality of guide grooves formed in the first direction,
the at least one ball comprises a plurality of balls provided in correspondence with the plurality of guide grooves, and
the at least one guide hole comprises a plurality of guide holes provided in correspondence with the plurality of balls.

5. The camera module according to claim 1, wherein the lens driving unit includes a voice coil motor.

6. The camera module according to claim 5, wherein
the voice coil motor includes a coil, and a magnet attached to the second lens barrel to face the coil,
the second lens barrel has a flat surface provided with the second guide recess, and a side surface crossing the flat surface, and
the magnet is attached to the side surface.

7. The camera module according to claim 1, wherein
the first lens barrel has an incorporation surface for incorporating the second lens barrel,
the second lens barrel has a side surface facing the incorporation surface,
the first guide recess is formed in the incorporation surface, and
the second guide recess is formed in the side surface.

8. The camera module according to claim 1, wherein
the first lens barrel has a placement surface for placing the second lens barrel,
the second lens barrel has a bottom surface facing the placement surface,
the first guide recess is formed in the placement surface, and
the second guide recess is formed in the bottom surface.

9. The camera module according to claim 1, further comprising:
a reflective element configured to guide, along the first optical axis, the object light that has entered along a second optical axis intersecting with the first optical axis;
an image pickup unit having an image pickup element configured to convert the object light that has passed through the second lens group into an electric signal, and
a case holding the reflective element, the first lens barrel, the lens driving unit, and the image pickup unit.

* * * * *